(12) United States Patent
Minami

(10) Patent No.: US 8,332,565 B2
(45) Date of Patent: Dec. 11, 2012

(54) USB DONGLE CORRELATING A DEVICE CLASS TO THE PROTOCOL OF A WIRELESS DEVICE

(75) Inventor: Eiji Minami, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 12/907,780

(22) Filed: Oct. 19, 2010

(65) Prior Publication Data

US 2011/0093634 A1  Apr. 21, 2011

(30) Foreign Application Priority Data

Oct. 20, 2009  (JP) ................. 2009-241604

(51) Int. Cl.
*G06F 13/36* (2006.01)
*G06F 13/42* (2006.01)

(52) U.S. Cl. .............. 710/311; 710/313; 710/315

(58) Field of Classification Search .............. 710/305
See application file for complete search history.

(56) References Cited

U.S. PATENT DOCUMENTS

| | | | | |
|---|---|---|---|---|
| 7,051,149 B2 * | 5/2006 | Wang et al. | | 710/315 |
| 7,200,685 B2 * | 4/2007 | Uemura | | 710/2 |
| 7,356,635 B2 * | 4/2008 | Woodings et al. | | 710/311 |
| 7,458,075 B2 * | 11/2008 | Keys | | 718/1 |
| 7,584,313 B1 * | 9/2009 | Hay et al. | | 710/62 |
| 7,715,834 B2 * | 5/2010 | Hibino | | 455/420 |
| 7,765,354 B2 * | 7/2010 | Woodings et al. | | 710/311 |
| 7,802,047 B2 * | 9/2010 | Chung et al. | | 710/313 |
| 7,876,275 B2 * | 1/2011 | Sato | | 343/702 |
| 8,037,218 B2 * | 10/2011 | Fujii et al. | | 710/38 |
| 8,095,705 B2 * | 1/2012 | Ogasawara | | 710/38 |
| 2003/0204661 A1 * | 10/2003 | Uemura | | 710/305 |
| 2004/0044807 A1 * | 3/2004 | Wang et al. | | 710/5 |
| 2008/0126657 A1 * | 5/2008 | Chang et al. | | 710/301 |
| 2009/0006699 A1 * | 1/2009 | Rofougaran | | 710/304 |
| 2010/0164813 A1 * | 7/2010 | Sato | | 343/702 |
| 2010/0267336 A1 * | 10/2010 | Maekawa | | 455/41.2 |
| 2011/0106984 A1 * | 5/2011 | Tanaka et al. | | 710/16 |
| 2011/0151784 A1 * | 6/2011 | Ohkita | | 455/41.2 |
| 2011/0191499 A1 * | 8/2011 | Andersson et al. | | 710/5 |

FOREIGN PATENT DOCUMENTS

JP  2008-278170 A  11/2008

* cited by examiner

*Primary Examiner* — Ryan Stiglic
(74) *Attorney, Agent, or Firm* — Kilpatrick Townsend & Stockton LLP

(57) ABSTRACT

A USB device includes: a communication section that is capable of wirelessly communicating with a communication device that supports a predetermined communication standard; a USB communication section that is capable of communicating with a USB host device; and a connection section that, when a connection to the communication device is requested under the condition that a connection to the USB host device is requested, determines whether or not a protocol supported by the communication device is any of multiple protocols, and establishes the connection to the USB host device through the USB communication section using a device class corresponding to the determined protocol.

9 Claims, 3 Drawing Sheets

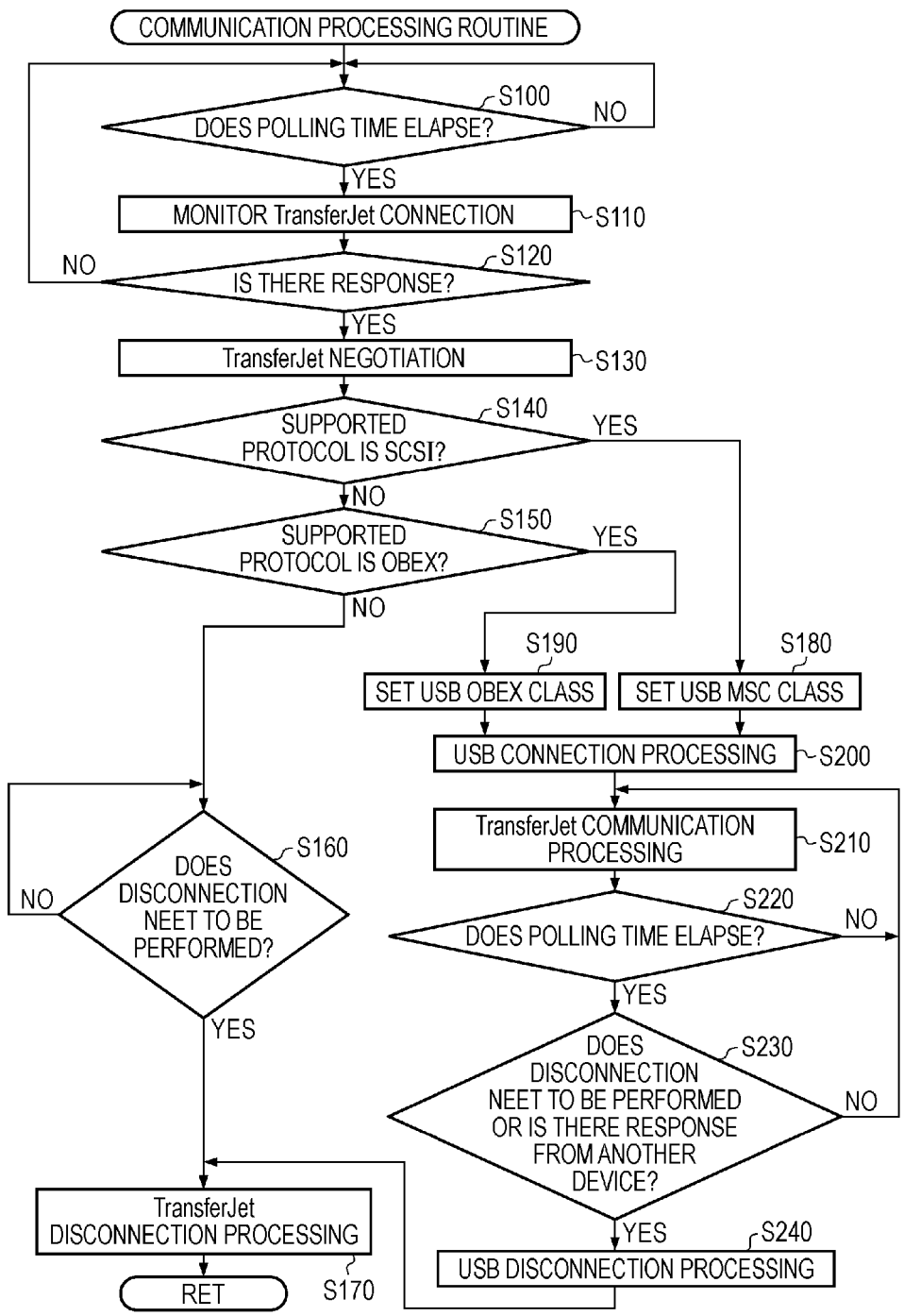

USB DONGLE CORRELATING A DEVICE CLASS TO THE PROTOCOL OF A WIRELESS DEVICE

CROSS-REFERENCE TO RELATED APPLICATIONS

This application claims priority to Japanese Patent Application No. 2009-241604, filed Oct. 20, 2009, the entirety of which is expressly incorporated by reference herein.

BACKGROUND

1. Technical Field

The present invention relates to a USB device that is connected to a USB host device via a USB connection and wirelessly connected to a TransferJet device that supports TransferJet so that communication is performed between the USB host device and the TransferJet device.

2. Related Art

Various types of near-field communication techniques, in which communication is performed by holding a device over another device to which data is to be transmitted, have been developed (for example, refer to JP-A-2008-278170). One of the near-field communication techniques is TransferJet. In TransferJet, a connection is automatically established between devices by holding one of the devices over the other device so that communication is performed between the devices. TransferJet achieves a communication rate of up to 560 Mbps. The communication distance is approximately several centimeters, and the communication does not interfere with another wireless system.

In TransferJet, various protocols such as Small Computer System Interface (SCSI) and OBject EXchange (OBEX) are used for various purposes. It is assumed that a USB device (USB dongle) that supports TransferJet is attached to a USB host device and a TransferJet device is treated as a USB device and communicates with the USB host device. In the assumption, since a protocol supported by the TransferJet device to be connected varies depending on the TransferJet device, it is necessary that the USB host device and the USB device be connected to each other via a USB connection using multiple interfaces such as a USB hub and a USB multi-interface. In this case, additional hardware is necessary for the interfaces. Thus, the devices become complex, and there is a disadvantage in terms of the cost. In addition, since the multiple interfaces are used, the USB host device activates multiple interface drivers and monitors the interfaces. Thus, many resources are necessary for the USB host device.

SUMMARY

An advantage of some aspects of the invention is that it provides a USB device that appropriately handles communication using a protocol that is supported by a TransferJet device during a communication relay between a USB host device and the TransferJet device.

According to aspects of the invention, a USB device is configured as follows.

According to a first aspect of the invention, a USB device that is connected to a USB host device via a USB connection and wirelessly connected to a TransferJet device that supports TransferJet so that communication is performed between the USB host device and the TransferJet device includes: a TransferJet communication section that is capable of communicating with the TransferJet device; a USB communication section that is capable of communicating with the USB host device; and a connection section that, when a connection to the USB host device is requested, stands by without establishing the connection to the USB host device, and, when a connection to the TransferJet device is requested under the condition that the connection to the USB host device is requested, determines whether or not a protocol supported by the TransferJet device is any of different multiple protocols including Small Computer System Interface (SCSI) and OBject EXchange (OBEX), and selects a device class from among different multiple USB device classes on the basis of the determined protocol, sets the selected device class and establishes the connection to the USB host device through the USB communication section using the set device class.

In the USB device according to the first aspect of the invention, it is preferable that the connection section stand by without establishing the connection to the USB host device when the connection to the USB host device is requested, determine whether or not the protocol supported by the TransferJet device is any of the different multiple protocols including SCSI and OBEX when the connection to the TransferJet device is requested under the condition that the connection to the USB host device is requested, select a device class from among the different multiple USB device classes on the basis of the determined protocol, set the selected device class, and establish the connection to the USB host device using the set device class. Thus, it is possible to establish a USB connection using the protocol supported by the TransferJet device (requested to be connected) regardless of the type of the protocol. As a result, the USB device can appropriately handle communication using the protocol that is supported by the TransferJet device during a communication relay between the USB host device and the TransferJet device.

According to a second aspect of the invention, a USB device that is connected to a USB host device via a USB connection and wirelessly connected to a TransferJet device that supports TransferJet so that communication is performed between the USB host device and the TransferJet device includes: a TransferJet communication section that is capable of communicating with the TransferJet device; a USB communication section that is capable of communicating with the USB host device; and a connection section that, when a connection to one of TransferJet devices is requested under the condition that a connection to the USB host device is established and a connection to another one of the TransferJet devices is established, disconnects the connection to the USB host device, determines whether or not a protocol supported by the one of the TransferJet devices is any of different multiple protocols including SCSI and OBEX, selects a device class from among different multiple USB device classes on the basis of the determined protocol, sets the selected device class and reestablishes the connection to the USB host device through the USB communication section using the set device class.

In the USB device according to the second aspect of the invention, it is preferable that the connection section disconnect the connection to the USB host device when a connection to one of the TransferJet devices is requested under the condition that the connection to the USB host device is established and a connection to another one of the TransferJet devices is established, determine whether or not the protocol supported by the one of the TransferJet devices is any of the different multiple protocols including SCSI and OBEX, select a device class from among the different multiple USB device classes on the basis of the determined protocol, set the selected device class and reestablish the connection to the USB host device using the set device class. The USB device can handle the case where two or more TransferJet devices are simultaneously requested to be connected.

In the USB device according to the first or second aspect of the invention, the connection section may disable the connection to the USB host device when disconnection from the TransferJet device is requested. In this case, it is possible to suppress power that is consumed by resources (such as a CPU and a memory) that are included in the USB host device.

In the USB device according to the first or second aspect of the invention, when the connection section determines that the protocol supported by the TransferJet device is SCSI, the connection section may establish the connection to the USB host device using Mass Storage Class; and when the connection section determines that the protocol supported by the TransferJet device is OBEX, the connection section may establish the connection to the USB host device using a Bluetooth class.

According to the first or second aspect of the invention, the USB device may be capable of being connected, via a USB connection, to a printing device that serves as the USB host device.

BRIEF DESCRIPTION OF THE DRAWINGS

The invention will be described with reference to the accompanying drawings, wherein like numbers reference like elements.

FIG. 3 is a flowchart showing an example of a communication processing routine.

DESCRIPTION OF EXEMPLARY EMBODIMENTS

Figure 1:
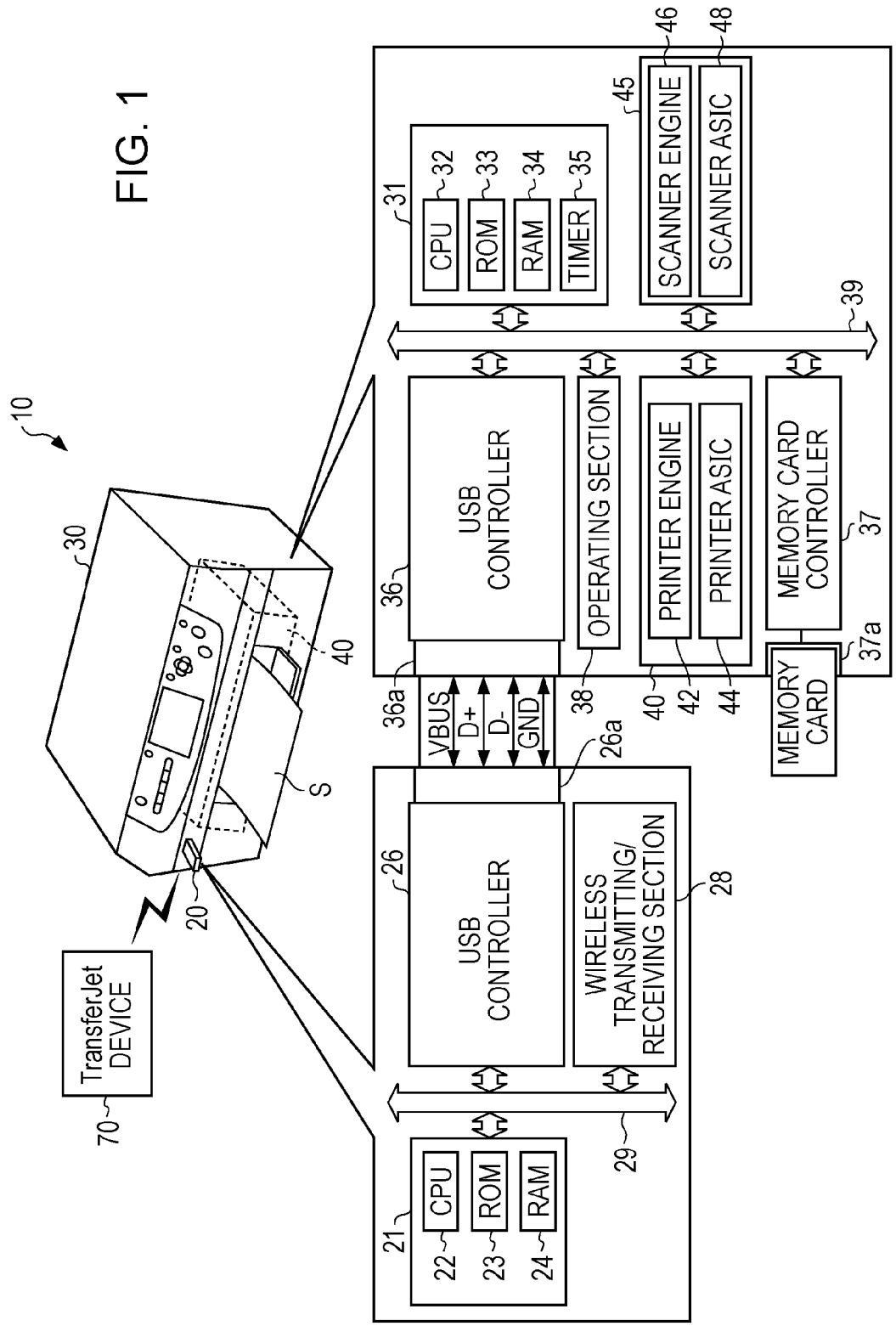
FIG. 1 is an outline diagram showing the configuration of a communication system.

An embodiment of the invention is described below with reference to the accompanying drawings. FIG. 1 is an outline diagram showing the configuration of a communication system 10 that includes a USB dongle 20 and a printer 30. The USB dongle 20 serves as a USB device according to the embodiment of the invention. The printer 30 serves as a USB host device according to the embodiment of the invention.

As shown in FIG. 1, the communication system 10 according to the embodiment includes the USB dongle 20 and the printer 30. The USB dongle 20 is capable of communicating with a TransferJet device 70 and supports TransferJet. The printer 30 is capable of being connected to the USB dongle 20 via a USB connection. The TransferJet device 70 transmits and receives data to and from the printer 30 through the USB dongle 20.

The printer 30 includes a main controller 31, a printer unit 40, a scanner unit 45, a USB controller 36, a memory card controller 37 and an operating section 38. The main controller 31 controls the entire printer 30. The printer unit 40 includes a printer engine 42 and a printer ASIC 44 and prints data on a recording sheet S by supplying ink (serving as a colorant) onto the recording sheet S. The printer engine 42 serves as a known ink jet color printer mechanism. The printer ASIC 44 controls the printer engine 42. The scanner unit 45 includes a scanner engine 46 and a scanner ASIC 48. The scanner unit 45 optically reads an original sheet placed on an original sheet holder and generates image data. The scanner engine 46 serves as an image scanner. The scanner ASIC 48 controls the scanner engine 46. The USB controller 36 serves as a USB host controller. The memory card controller 37 receives and outputs data from and to a memory card MC inserted in a memory card slot 37a. The operating section 38 includes a power supply button, a mode selection button and a start button. The mode selection button is pressed to select a mode from operation modes. The main controller 31, the printer unit 40, the scanner unit 45, the USB controller 36, the memory card controller 37 and the operating section 38 are electrically connected to each other through a bus 39. The main controller 31 is configured as a microprocessor and includes a CPU 32 (that is a main part), a ROM 33 and a RAM 34. The ROM 33 stores various processing programs. The RAM 34 temporarily stores data. The operation modes that can be selected by the mode selection button include a scanning mode, a copy mode and a memory card mode. In the scanning mode, the printer 30 reads the original sheet placed on the original sheet holder. In the copy mode, the printer 30 reads the original sheet placed on the original sheet holder and prints the read data. In the memory card mode, the printer 30 reads image data stored in the memory card MC and prints the read image data.

The USB controller 36 serves as the USB host controller that controls data communication that is performed between the printer 30 and the USB dongle 20. The USB controller 36 has a connection terminal 36a that is capable of being connected to two power supply lines (VBUS line and GND line) and two signal lines (D+ line and D− line).

The USB dongle 20 includes a main controller 21, a USB controller 26 and a wireless transmitting/receiving section 28. The main controller 21 controls the entire USB dongle 20. The USB controller 26 performs data communication with the printer 30 via a USB connection. The wireless transmitting/receiving section 28 supports TransferJet. The main controller 21, the USB controller 26 and the wireless transmitting/receiving section 28 are electrically connected to each other through a bus 29. The main controller 21 is configured as a microprocessor and includes a CPU 22 (that is a main part), a ROM 23 and a RAM 24. The ROM 23 stores various processing programs. The RAM 24 temporarily stores data.

The USB controller 26 controls data communication that is performed between the USB dongle 20 and the USB controller 36 of the printer 30 while the USB dongle 20 is attached to the printer 30. The USB controller 26 has a connection terminal 26a that is capable of being connected to two power supply lines (VBUS line and GND line) and two signal lines (D+ line and D− line).

Figure 2:
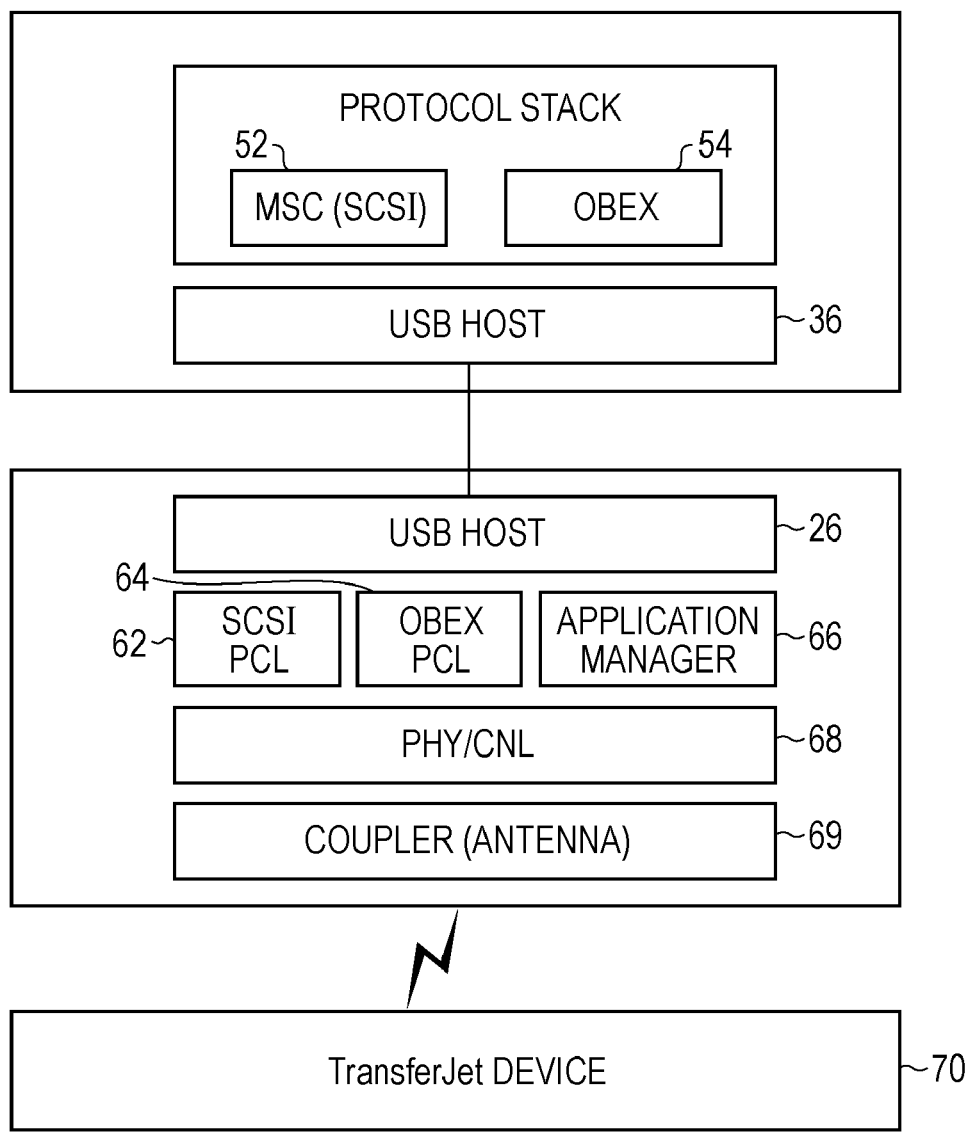
FIG. 2 is a block diagram showing an example of a protocol stack used by the communication system.

A protocol stack that is used by the communication system 10 (configured as described above) according to the present embodiment is described below. FIG. 2 is a block diagram showing an example of the protocol stack that is used by the communication system 10. In the USB dongle 20, a protocol stack that is used to perform wireless communication between the USB dongle 20 and the TransferJet device 70 is defined as shown in FIG. 2. As the protocol stack defined in the USB dongle 20, a SCSI protocol conversion layer (PCL) 62, an OBEX protocol conversion layer (PCL) 64, an application manager 66 and a PHY/CNL 68 are defined. In the SCSI PCL 62 and the OBEX PCL 64, existing interface standards (SCSI and OBEX) are converted. The application manager 64 centrally manages applications. The PHY/CNL 68 is constituted by a physical layer (PHY) and a connection layer (CNL). In the physical layer, data is converted into an RF signal that is suitable for transmission to a coupler (antenna) 69, and the actual wireless communication is performed. In the connection layer, a connection is established between the USB dongle 20 and the TransferJet device (communication device) 70 and disconnected. The connection layer provides a packet including the data and confirms whether or not the packet is transferred to the communication device. In the printer 30, Mass Storage Class (MSC) 52 and OBEX 54 are defined as a protocol stack that is designed to communicate with the TransferJet device 70 through the USB dongle 20.

Next, operations of the communication system 10 (configured as described above) according to the present embodiment are described. The operations of the communication system 10 are performed while data transfer is performed between the TransferJet device 70 and the printer 30 (to which the USB dongle 20 is attached) by placing the TransferJet device 70 close to the USB dongle 20. FIG. 3 is a flowchart showing an example of a communication processing routine that is executed by the CPU 22 of the main controller 21 included in the USB dongle 20. The routine is repeatedly performed while the USB dongle 20 that supports TransferJet is attached to the printer 30. In this case, even when the USB dongle 20 is attached to the printer 30, the D+ line and the D− line are pulled down, and the USB dongle 20 stands by without establishing a connection to the printer 30.

After the communication processing routine is executed, the CPU 22 first determines whether or not a preset polling time elapses (in step S100). After the preset polling time elapses, the CPU 22 monitors a response (transmitted from the TransferJet device 70) in order to determine whether or not the TransferJet device 70 is located in a communication region (in step S110). Then, the CPU 22 determines whether or not the USB dongle 20 receives the response (in step S120). When the CPU 22 determines that the USB dongle 20 does not receive the response in step S120, the process returns to step S100, and steps S100 and S110 are repeated. When the CPU 22 determines that the USB dongle receives the response in step S120, the USB dongle 20 negotiates with the TransferJet device 70 before communication and exchanges information on a communication protocol and the like with the TransferJet device 70 (in step S130). Then, the CPU 22 determines whether or not the protocol supported by the TransferJet device 70 is SCSI (in step S140). In addition, the CPU 22 determines whether or not the protocol supported by the TransferJet device 70 is OBEX (in step S150). When the protocol supported by the TransferJet device 70 is not SCSI and OBEX, the CPU 22 determines that the printer 30 does not support the protocol supported by the TransferJet device 70. Then, the CPU 22 waits until the TransferJet device 70 is placed outside the communication region and the USB dongle 20 does not receive the response (in step S160). The CPU 22 executes TransferJet disconnection processing to disconnect the connection of the TransferJet device 70 (in step S170). Then, the routine is terminated.

When the CPU 22 determines that the protocol supported by the TransferJet device 70 is SCSI in step S140, USB Mass Storage Class is set as a device class (in step S180). When the CPU 22 determines that the protocol supported by the TransferJet device 70 is OBEX in step S140, USB OBEX Class (such as a BlueTooth class) that supports OBEX is set as the device class (in step S190). Then, the D+ line and the D− line are pulled up and a USB connection is established between the printer 30 and the USB dongle 20 using the set device class (in step S200). Thus, the printer 30 can communicates with the TransferJet device 70 through the USB dongle 20 using the protocol supported by the TransferJet device 70. It is assumed that a USB connection is established between the USB dongle 20 and the printer 30 immediately after the USB dongle 20 is attached to the printer 30. At this time, the printer 30 cannot identify the protocol that is supported by the TransferJet device 70 to be connected. Thus, it is necessary that the protocol be preset in the printer 30 so that the USB connection is established and a class driver that is provided for the protocol supported by the TransferJet device 70 be activated. When the TransferJet device 70 approaches the USB dongle 20 and enters in the communication region after the establishment of the USB connection and the activation of the class driver, and the protocol set in the printer 30 does not match the protocol supported by the TransferJet device 70, it is necessary that the protocol supported by the TransferJet device 70 be set in the printer 30 and the class driver be reactivated. For the time for setting the protocol and reactivating the class driver, the printer 30 needs to monitor whether or not the USB dongle 20 is removed from the printer 30 (interface monitoring). Thus, many resources are necessary for the printer 30. In the present embodiment, on the other hand, the USB connection is established between the printer 30 and the USB dongle 20 after completion of the negotiation with the TransferJet device 70 or after the protocol supported by the TransferJet device 70 is identified. Thus, the printer 30 activates the class driver (provided for the protocol supported by the TransferJet device 70) only one time. For the aforementioned reason, the USB connection is established between the printer 30 and the USB dongle 20 after the completion of the negotiation with the TransferJet device 70 in the present embodiment.

After the USB connection is established between the printer 30 and the USB dongle 20, the CPU 22 executes communication processing so that data is transferred between the TransferJet 70 and the printer 30 through the USB dongle 20 (in step S210). Then, the CPU 22 determines whether or not a preset polling time elapses (in step S220). After the preset polling time elapses, the CPU 22 determines whether or not the TransferJet 70 that is connected to the USB dongle 20 is placed outside the communication region so that the USB dongle 20 does not receive a response from the TransferJet device 70 (in step 230). Also, the CPU 22 determines whether or not another TransferJet device 70 is placed in the communication region so that the USB dongle 20 receives a response from the TransferJet device 70 (in step 230). When the USB dongle 20 receives the response from the TransferJet device 70 connected to the USB dongle 20 and does not receive the response from the other TransferJet device 70, the process returns to step S210, and the communication with the Transfer device 70 connected to the USB dongle 20 is continuously performed. When the USB dongle 20 does not receive the response from the TransferJet device 70 connected to the USB dongle 20 or receives the response from the other TransferJet device 70, the CPU 22 executes USB disconnection processing to disconnect the USB connection to the printer 30 (in step S240). After that, the CPU 22 executes TransferJet disconnection processing to disconnect the connection to the TransferJet device 70 (in step S170). Then, the routine is terminated. Next, it is assumed that one TransferJet device 70 is located in the communication region and another TransferJet device 70 enters in the communication region. In this assumption, the answer is affirmative in step 230. Thus, the USB connection to the printer 30 is disconnected, and the TransferJet connection between the TransferJet device 70 and the USB dongle 20 is also disconnected. When the routine is repeated after the disconnections, the CPU 22 determines that the USB dongle 20 receives a response in step S120. When a protocol supported by the other TransferJet device 70 is identified through negotiation with the other TransferJet device 70, a process of establishing a USB connection to the printer 30 is performed.

Next, relationships between the constituent elements according to the present embodiment and constituent elements according to the invention are described. The USB controller 26 according to the present embodiment corresponds to a "USB communication section" according to the invention. The wireless transmitting/receiving section 28 according to the present embodiment corresponds to a "TransferJet communication section" according to the invention. The main controller 21 according to the present embodiment corresponds to a "connection section" according to the invention.

When the USB dongle 20 according to the present embodiment is attached to the printer 30 (serving as the USB host device), the USB dongle 20 stands by without establishing the USB connection. After the TransferJet device 70 is held over the USB dongle 20 and the negotiation with the TransferJet device 70 is completed (communication protocols are exchanged), the USB connection is established between the printer 30 and the USB dongle 20 using the communication protocol. Thus, even when the TransferJet device 70 supports any of the protocols, the printer 30 activates a class driver provided for the protocol only once in order to establish the USB connection. Thus, it is possible to minimize the number of resources that are necessary for the printer 30. In addition, when the TransferJet communication is disconnected, the USB connection to the printer 30 is also disconnected. Thus, it is possible to suppress unnecessary power that is consumed by the resources (such as the CPU 32 and the RAM 34) of the printer 30. In addition, when the TransferJet device 70 that is connected to the USB dongle 20 is located in the communication region and another TransferJet device 70 enters in the communication region, the USB connection to the printer 30 is disconnected. Then, the USB dongle 20 negotiates the TransferJet device 70 that has transmitted a response received by the USB dongle 20. After that, the USB connection is established between the printer 30 and the USB dongle 20. Even when multiple TransferJet devices 70 are placed in the communication region, a multi-interface is not necessary and the USB dongle 20 can appropriately handle communication.

In the present embodiment, when the TransferJet device 70 that is connected to the USB dongle 20 is located in the communication region and another TransferJet device 70 enters in the communication region, the USB connection to the printer 30 is disconnected. In this case, however, the USB connection to the printer 30 may be maintained and communication may be performed between the printer 30 and the TransferJet device 70 connected to the USB dongle 20 until the TransferJet device 70 connected to the USB dongle 20 is placed outside the communication region.

In the present embodiment, SCSI and OBEX are supported. However, the interface standards are not limited to SCSI and OBEX. Other interface standards may be applied to the communication system.

The present embodiment describes, as an example, the printer 30 that serves as the USB host device and communicates with the TransferJet device through the USB dongle. The USB host device is not limited to the printer 30 and may be applied to any devices such as a personal computer and a television.

The invention is not limited to the aforementioned embodiment. The embodiment may be variously modified without departing from the technical scope of the invention.

What is claimed is:

1. A USB device comprising:
   a communication section that is capable of wirelessly communicating with a communication device that supports a predetermined communication standard;
   a USB communication section that is capable of communicating with a USB host device; and
   a connection section that, when a connection to the communication device is requested under the condition that a connection to the USB host device is requested, determines whether or not a protocol supported by the communication device is any of multiple protocols, and establishes the connection to the USB host device through the USB communication section using a device class corresponding to the determined protocol.

2. The USB device according to claim 1,
   wherein when the connection to the USB host device is requested, the connection section stands by without establishing the connection to the USB host device, and when the connection to the communication device is requested, the connection section establishes the connection to the USB host device.

3. The USB device according to claim 2,
   wherein the predetermined communication standard is TransferJet, and the communication device is a TransferJet device.

4. The USB device according to claim 1 that is capable of being connected, via a USB connection, to a printing device that serves as the USB host device.

5. A USB device comprising:
   a communication section that is capable of wirelessly communicating with communication devices that support a predetermined communication standard;
   a USB communication section that is capable of communicating with a USB host device; and
   a connection section that, when a connection to one of the communication devices is requested under the condition that a connection to the USB host device is established and a connection to another one of the communication devices is established, disconnects the connection to the USB host device and the connection to the other one of the communication devices, determines whether or not a protocol supported by the one of the communication devices is any of multiple protocols, and reestablishes the connection to the USB host device through the USB communication section using a device class corresponding to the determined protocol.

6. The USB device according to claim 5,
   wherein the connection section disables the connection to the USB host device when disconnection from the communication device is requested.

7. The USB device according to claim 6,
   wherein the predetermined standard is TransferJet, and the communication devices are TransferJet devices.

8. The USB device according to claim 7,
   wherein when the connection section determines that the protocol supported by the TransferJet device is Small Computer System Interface, the connection section establishes the connection to the USB host device using Mass Storage Class, and when the connection section determines that the protocol supported by the TransferJet device is OBject EXchange, the connection section establishes the connection to the USB host device using a Bluetooth class.

9. The USB device according to claim 5 that is capable of being connected, via a USB connection, to a printing device that serves as the USB host device.

* * * * *